United States Patent Office 3,068,687
Patented Dec. 18, 1962

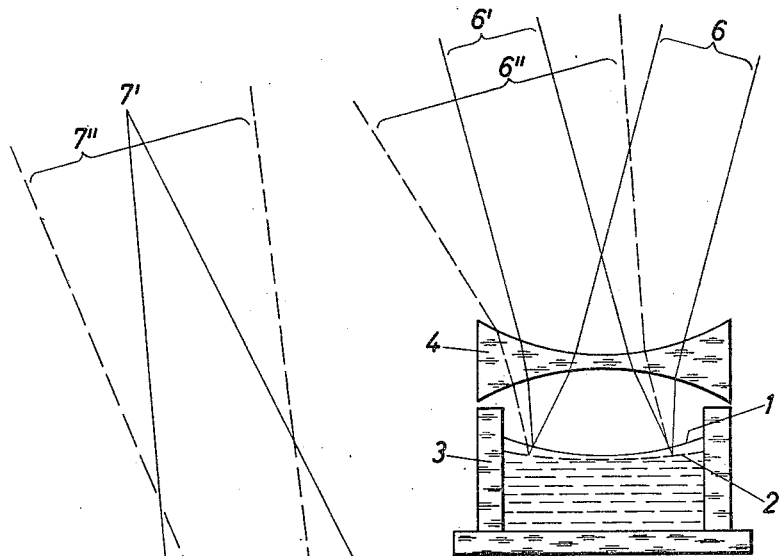
—FIG. 1.—
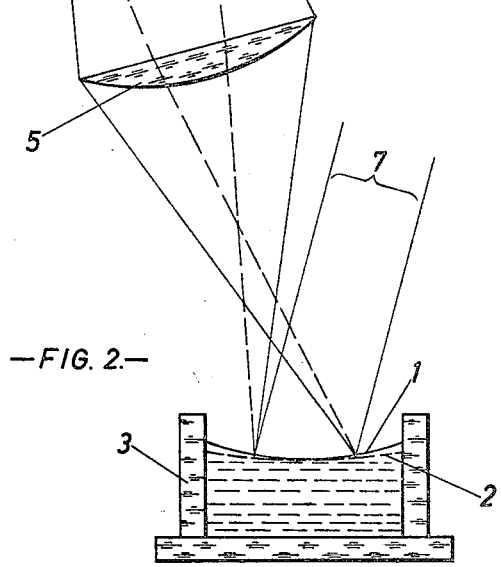
—FIG. 2.—

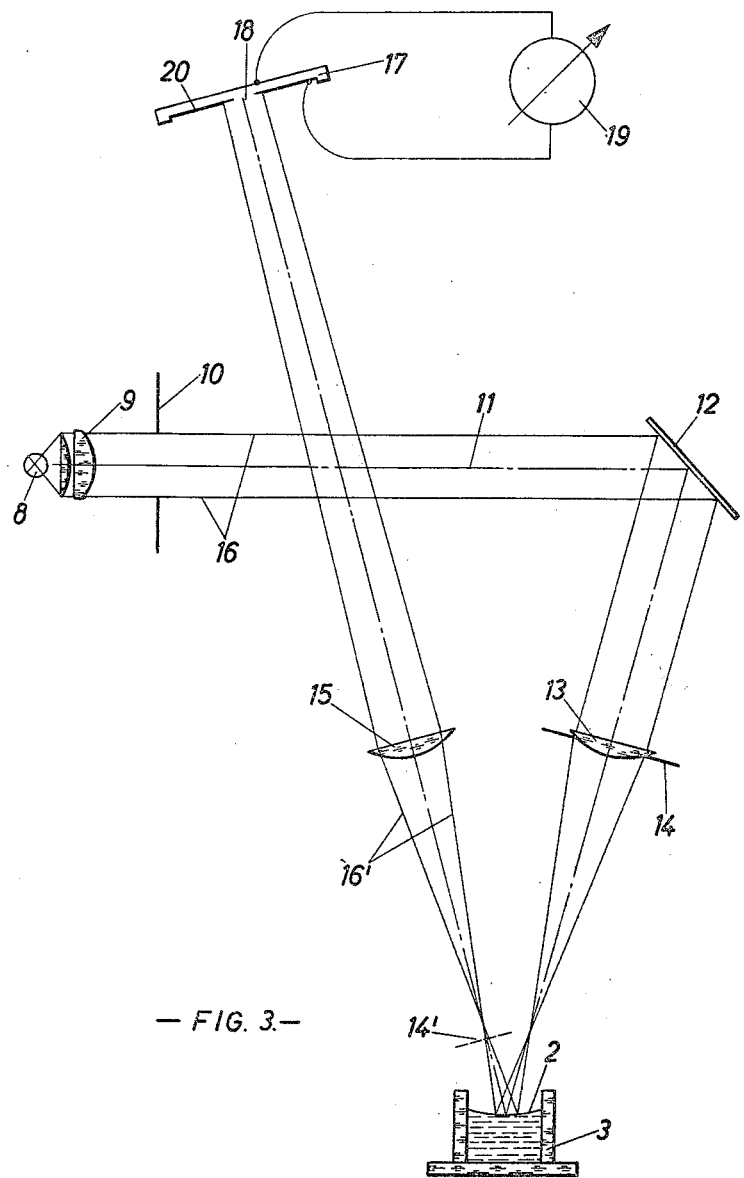
— FIG. 3.—

3,068,687
METHOD AND APPARATUS FOR MEASURING THE SURFACE TENSION OF LIQUIDS
Norbert Kleine, Merhausen, near Freiburg im Breisgau, and Max Matthes and Wolfgang Mueller, Freiburg im Breisgau, Germany, assignors to Fritz Hellige & Co. G.m.b.H., Freiburg im Breisgau, Germany, a company of Germany
Filed Jan. 19, 1960, Ser. No. 3,465
Claims priority, application Germany Jan. 19, 1959
8 Claims. (Cl. 73—53)

The present invention relates to the measurement of the surface tension of liquids.

Many static and dynamic methods are known for determining the surface tension of liquids by which accuracies to within 1% of the absolute value of the surface tension can be obtained. The reflection method of Eoetvoes enables the surface tension of liquids to be determined to within a few tenths of a percent but this method is somewhat complicated to perform.

One object of the present invention is to provide a method and apparatus for making a measurement of the surface tension of a liquid to an improved degree of accuracy, but at a comparatively small extra cost over the prior art methods and apparatus, and with little expenditure of time.

Another object of the present invention is to provide a method and apparatus for making a measurement of the surface tension of a liquid by optically determining the curvature of the meniscus of a sample of the liquid contained in a suitable vessel.

Other objects of the invention will be apparent from the following detailed description when read in conjunction with the accompanying drawings which serve to illustrate the invention by way of example only.

In the drawings:

FIGS. 1 and 2 are diagrammatic details of two forms of apparatus according to the invention and serve to illustrate the principle behind the invention, and FIG. 3 is a diagrammatic side elevation of a practical arrangement of apparatus according to the invention for making a measurement of the surface tension of liquids.

The apparatus shown in the drawings can be used to make a measurement of the surface tension of liquids to an accuracy within a few ten-thousandths of the absolute surface tension in a comparatively short time and at comparatively little cost.

According to the present invention apparatus for making a measurement of the surface tension of liquids comprises a vessel of predetermined, preferably circular, cross section for containing a sample of the liquid the surface tension of which is to be measured, means for directing a beam of light on to the meniscus of a sample of liquid in said vessel and means for determining the angle of aperture of the reflection of said beam in said liquid meniscus.

As is well known, the radius of curvature of the meniscus of a liquid contained in a small vessel, which does not permit the formation of an even surface in the centre of the liquid meniscus, is inversely proportional to the surface tension of the liquid and the apparatus of the present invention can therefore be used for obtaining a direct comparison between the surface tensions of different liquids. The absolute surface tension of the liquid can be calculated from measurements made by the apparatus but preferably the measurements made by the apparatus for different liquids are compared with the measurements made for a standard liquid having a known surface tension by which the apparatus can be suitably calibrated.

The proposal of the present invention can be carried out in various ways. The reflecting property of the curved meniscus of the liquid is utilised rather than the optical lens property of the liquid because the refractivity of the liquid being examined would also have an effect where the lens property used, and moreover a high proportion of the light beam is likely to be absorbed. The change in the angle of aperture of the reflected beam is determined by the focal length of the liquid meniscus and presents a reproducible measurement of the surface tension of the liquid being examined.

Additional optical means may also be provided in the apparatus of the present invention to assist in making a measurement of the angle of aperture of the reflected beam. By inserting concave or convex lenses into the reflected beam or by moving lenses along the optical axis of the beam, either a full compensation for the change of the angle of aperture of the reflected beam between two different liquids or a compensation of the angle of aperture of the beam into a range which is more readily measurable can be obtained.

As seen in FIGS. 1 and 2, a light beam 6 or 7 impinges on the surface of a liquid in a vessel 3. A beam 6' or 7' is reflected from a meniscus 1 of a first liquid, whilst a beam 6" or 7" (indicated in broken lines) is reflected from a meniscus 2 (also shown in dotted lines) of a second liquid of different surface tension obtained, e.g. either by exchanging the liquid in the vessel 3 or by adding materials which become dissolved therein. The vessel 3 may be a narrow trough or a cuvette but is preferably a vessel having a circular cross section. In FIG. 1 a concave lens 4 is placed in the beams 6' or 6" whereas in FIG. 2 a plano-convex lens 5 is placed in the beams 7' or 7". As can be seen in FIGS. 1 and 2, the width of the beams 6', 6", 7' and 7" is dependent upon the shape of the meniscus which in turn is dependent upon the surface tension of the liquid contained in the vessel 3.

In order to be able to measure with great sensitivity the changes in the width of the beam 6' or 7' reflected from the surface of different liquids, the centre part of the beam, sensitive only slightly to changes in the focal length of the meniscus, can be effectively shut off by an opaque diaphragm and only an annular peripheral part of the beam utilised for measurement. The peripheral part of the beam is most sensitive to changes in the focal length of the meniscus.

In the arrangement shown in FIG. 3, a light beam issuing from a light source 8 has an optical axis 11 (indicated by a chain dotted line). A parallel beam 16 is obtained from the source 8 by a condenser 9 and is clearly defined at its periphery by a diaphragm 10 and is reflected by a mirror 12. In order, for greater accuracy, to use only a small approximately cap-shaped part of the surface of the liquid for measuring purposes, a convex lens 13 is interposed in the reflected beam between the mirror 12 and the meniscus 2 of the liquid. The lens 13 reduces the image of the diaphragm 10 and the meniscus 2 acts as a concave mirror and produces at 14' an image of an aperture 14, for example holding the lens 13.

The position of the image 14' changes with the radius of curvature of the surface of the liquid due to the change in the angle of aperture of the beam 16' reflected from the meniscus 2. Another convex lens 15 serves to concentrate the reflected beam 16' on to an area of a photo-element 17 arranged in the path of the reflected beam and utilised for the measurement. A change in the angle of aperture of the beam 16' results in an extension or restriction of the irradiated active surface of the photo-element. The photo-element 17 has a central, photo-electrically inactive area 18 which has the effect of a diaphragm and is just made large enough for a limited quantity of light to fall on the peripheral active annular zone 20 of the photo-element when a liquid having the maximum surface tension to be measured is placed in the vessel 3. The photo-electric current measured by an indicating device 19 is then a standard reference for comparing the surface tension of other liquids with that having said maximum surface tension. The smaller the surface tension is, the greater is the photo-electric current measured. The entire apparatus is enclosed in an opaque casing (not shown).

By means of such measuring apparatus it is theoretically possible, by suitably dimensioning the central photo-electrically inactive area 18 of the photo-element, to record any small changes of the angle of aperture of the reflected light beam 16' and, consequently, of the surface tension. In practice a limit is set to this process only by the lower reference limit of the photo-electric current.

By circling out the centre part of the beam, the high measurement sensitivity can be utilised only in a limited range of surface tensions. However, means of a simple nature are available for including any ranges of surface tension.

As is well known, the radius of curvature of the meniscus of a liquid in a circular, cylindrical upright vessel is not only inversely proportional to the surface tension, but is also proportional to the third power of the diameter of the vessel. Thus by varying the diameter of the vessel the radius of curvature of the meniscus can also be varied. If a given optical system is provided in combination with several vessels of different diameter then each vessel can be utilised for examining liquids the surface tension of which lies within a particular range. Preferably the diameters of the vessels are so chosen that they are approximately proportioned to the cube root of the mean surface tension in the relevant range of surface tension to be measured.

Also it is possible to construct surface tension measuring apparatus in such a manner that, for a given wall spacing of the vessel 3, that is for a given diameter of the vessel when the vessel is cylindrical, the position of the meniscus contained in the vessel is adjustable along the optical axis of the optical system relative to the optical path of the beam according to the range of surface tension within which the surface tension of the liquid being examined lies. This is preferably achieved by adjusting the position of the vessel itself.

In a further arrangement a conical vessel is utilised, the vessel preferably enlarging upwardly. In this particular case the liquid must be at a particular height in the vessel so that the diameter of its meniscus corresponds to the fixed mean value of the range of surface tension within which surface tension of the liquid is assumed to lie. The height of the meniscus in the vessel may be predetermined by accurately predetermining the quantity of liquid placed in the vessel or by placing suitable bodies inside the vessel to raise the level of the meniscus. By this means substantially all ranges of surface tension can be examined by the apparatus. Where a vessel having walls other than vertical is used, that is particularly in the case of a conical vessel, the effect of the inclination of the walls upon the curvature of the meniscus of the liquid must be taken into account.

A further way of enabling the apparatus to be used for examining liquids having surface tensions in different ranges comprises changing the size and/or position of the diaphragm serving to blank off the centre portion 18 of the light beam.

Finally, the indicating device 19, such as a galvanometer, serving for the measurement of the peripheral portion of the beam which is not screened by the diaphragm, is preferably so graduated that the values of the surface tension can be directly read from its scale. The described embodiments of the invention are based on a mesurement of light intensity. However, the reflected beam could also be allowed to fall on a screen provided with a scale or on a matt glass screen and thus the variations of its angle of aperture and the surface tension can be directly read if the scale is suitably graduated.

The invention is of special significance in the field of medicine and biology, since very important conclusions can be drawn from the surface tension in respect of the composition of liquids.

In general the light reflected from the surface of the liquid will be used for determining the surface tension, since such liquids are normally clouded or not sufficiently translucent to be able to utilise the lens property of the layer of liquid. Thus the refractivity of the liquid does not influence the change of the angle of aperture of the beam with surface tension.

We claim:

1. A method of comparing the surface tension of at least two liquids, comprising providing confined first and second liquids, each of said liquids having a meniscus of determinable curvature, directing a beam of light on each said meniscus to reflect the beam therefrom, measuring the angle of aperture of each said reflected beam of light, and comparing said angles of aperture of said reflected beams of light as a measure of the difference in surface tension of said first and second liquids.

2. A method as claimed in claim 1, further comprising interrupting a portion of the reflected beams of light and electrically measuring the remaining portion of said reflected beams of light.

3. Apparatus for measuring the surface tension of a liquid as a measure of the curvature of the meniscus of the liquid, said apparatus comprising: means for containing a liquid to provide a meniscus of determinable curvature, means operatively associated with said vessel for directing a beam of light on said meniscus to reflect the beam therefrom, the reflected beam having an angle of aperture, and further means operatively associated with said vessel for measuring said angle of aperture, said angle of aperture being a measure of the surface tension of the liquid.

4. Apparatus as claimed in claim 3, wherein the means for containing the liquid is a container having a circular cross-section.

5. Apparatus as claimed in claim 3, wherein said means for measuring said angle includes a light sensitive element adapted for irradiation by the reflected beam in relation to the angle of aperture of the reflected beam.

6. Apparatus as claimed in claim 3, further comprising intercepting means operatively associated with the beam of light to intercept a portion of said beam and defining a peripheral remaining portion of determinable size.

7. Apparatus as claimed in claim 6, wherein said intercepting means is selectively variable to control the size of the remaining portion.

8. Apparatus for measuring the surface tension of a liquid as a measure of the curvature of the meniscus of the liquid, said apparatus comprising: a vessel for containing a liquid to provide a meniscus of determinable curvature, means operatively associated with the vessel for directing a beam of light on said meniscus, said beam of light being reflected from the meniscus and having an angle of aperture relative to the curvature of the meniscus, a photo-electric element in the reflected beam of light and sensitive in part at least to said beam of light whereby a photo-electric current is generated, the photo-electric element having a central portion thereof coaxial with the beam of reflected light, said central portion being insensitive to the reflected beam of light, and means coupled to the photo-electric element for measuring said photo-electric current, said photo-electric current being dependent upon the curvature of the meniscus which is inversely proportional to the surface tension of the liquid.

References Cited in the file of this patent

UNITED STATES PATENTS

| | | |
|---|---|---|
| 2,625,658 | Robinson | Jan. 13, 1953 |
| 2,769,365 | Loeschcke et al. | Nov. 6, 1956 |
| 2,873,714 | Bauerlein | Feb. 17, 1959 |
| 2,948,186 | Kendall | Aug. 9, 1960 |